Jan. 13, 1948.     E. R. BRANDT     2,434,387
ARTICLE CARRIER
Filed Aug. 17, 1946     2 Sheets-Sheet 2
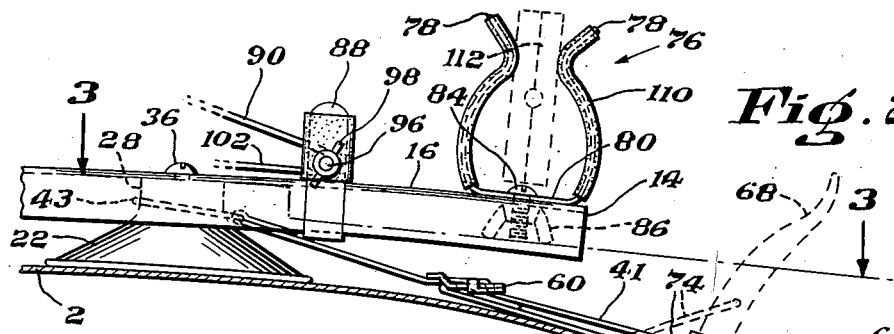
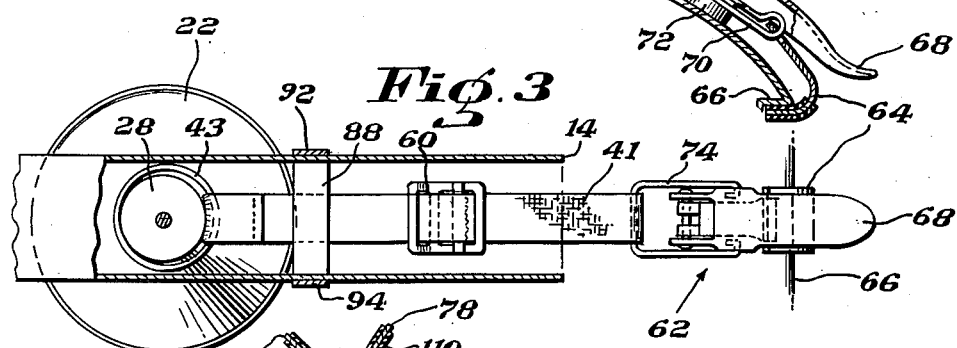
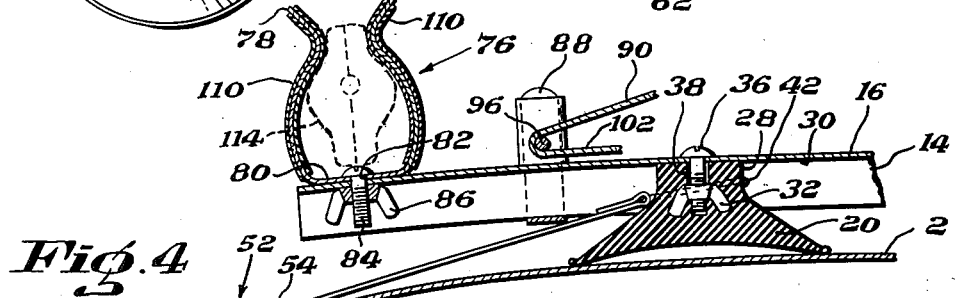
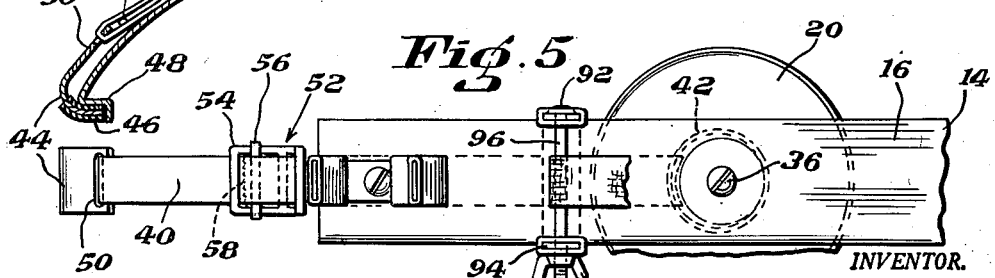
INVENTOR.
Edison R. Brandt
BY
ATTORNEY Patented Jan. 13, 1948

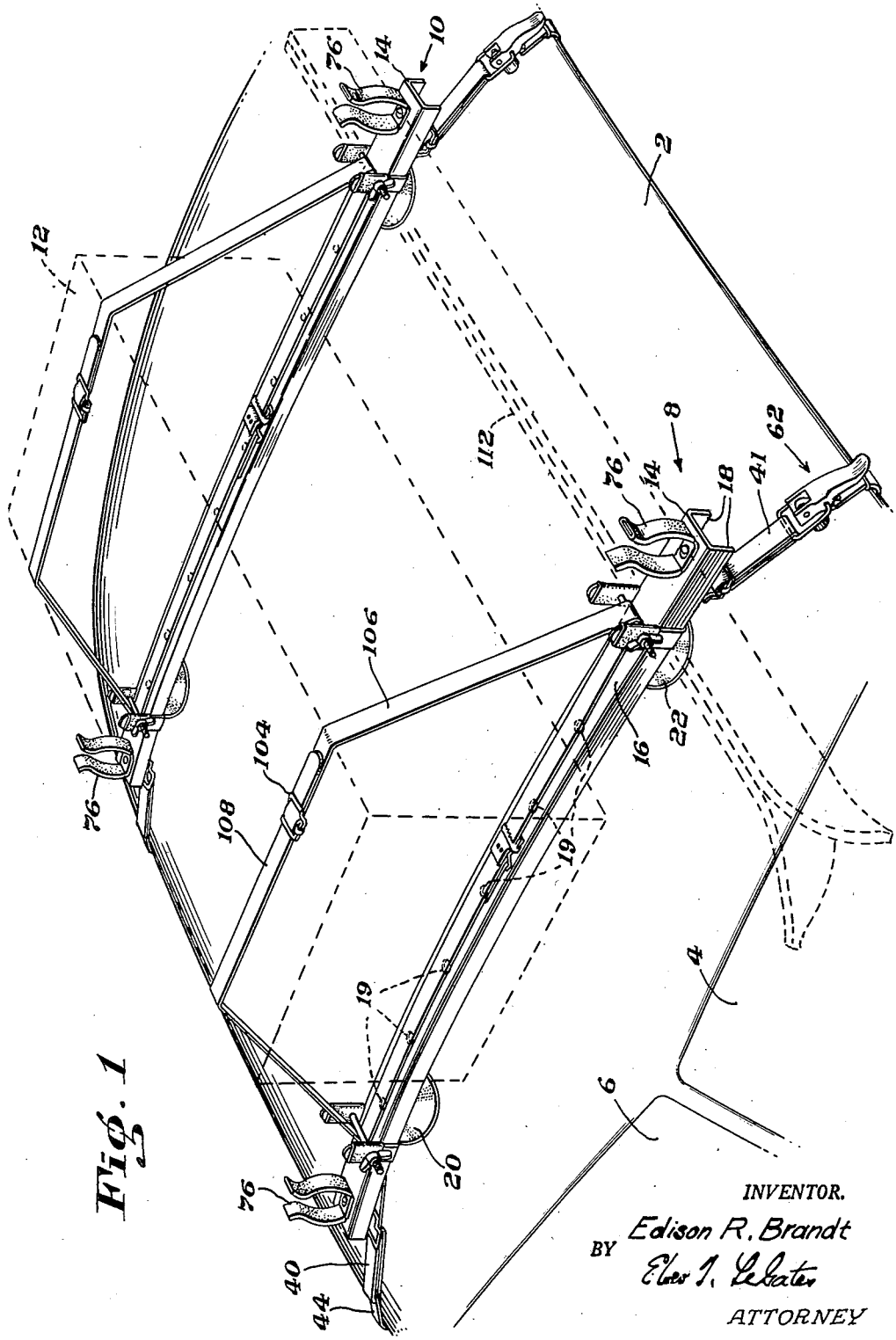

2,434,387

UNITED STATES PATENT OFFICE 2,434,387

ARTICLE CARRIER

Edison R. Brandt, Marblehead, Mass., assignor to Edison Engineering Company, Inc., Swampscott, Mass., a corporation of Massachusetts Application August 17, 1946, Serial No. 691,355

1 Claim. (Cl. 224—)

The present invention relates to an attachment for use on the top of an automobile for carrying thereon articles such as skis, boats, luggage and the like. An object of the invention is to provide an attachment of this character which is light in weight yet rugged and durable in construction, which presents an attractive appearance when in its carrying position on the automobile top, and which does not interfere with the normal use and operation of the car.

Another object is to provide a carrying attachment which may be mounted on the automobile and removed therefrom with a minimum of time and effort, but which, nevertheless, is positively and dependably held in place when in its carrying position and is so constructed as to protect both the automobile and the article which is being carried from chafing or other injury while the car is in motion.

In a preferred embodiment of the invention, the carrying attachment includes a rigid bar, which may be channel shaped in cross-section and curved longitudinally to conform approximately to the curvature of the modern automobile top when placed transversely thereof and spaced slightly therefrom. Means are provided for holding the bar in spaced relation to the automobile top. Means also are provided for removably attaching the metal bar to the automobile top and for removably securing the article to be carried to the bar. Normally the carrying attachments will be employed in sets of two or more. For the articles which it is most commonly desired to carry, such as skis, light boats, and light luggage or duffel, two of the attachments will ordinarily suffice.

The means for securing the bar to the top of the car includes a member adjustable in length to adapt the attachment to cars of different sizes and a toggle fastener connecting an adjustable member to a hooklike element adapted to engage under the gutter or beading which is located along the sides of the automobile top. When the operating handle of the toggle is moved past dead center to its closed or clamping position, the hook is drawn toward the adjustable member to securely fasten the attachment in place on the automobile top. The toggle fastener may be operated to an open, releasing, position in which it increases the distance between the adjustable member and the hook to permit the attachment to be removed from the car.

The means for removably securing the article to be carried to the bar may take various forms, depending upon the shape and size of the article. It is contemplated that the fastening devices of the different forms be interchangeable with each other so that the carrying attachment will be adaptable to different articles and so that the same attachment may be used, for example, for carrying skis in the winter time and a boat in the summer time. Also, different fastening means may be employed simultaneously for carrying at the same time articles of a dissimilar character.

The invention will be better understood from the annexed drawings forming a part hereof, wherein Fig. 1 is a perspective view showing the carrier of the present invention in place on an automobile top;

Fig. 2 is a front elevation of one end of the carrier partly broken away to show the construction of the toggle member;

Fig. 3 is a cross-sectional view on line 3—3 of Fig. 2;

Fig. 4 is a vertical mid section through the other end of the carrier;

Fig. 5 is a plan view of the structure shown in Fig. 4; and

Fig. 6 is a detail vertical mid sectional view of a suction cup forming part of the carrier.

Referring to Fig. 1 of the drawings, the numeral 2 indicates the top of a conventional automobile of which the windshield is shown at 4 and 6. Two of the carrying attachments of the present invention are in position on the top of the car at 8 and 10 so that they jointly support the article shown in phantom at 12 and the pair of skis shown at 112.

The carrying attachments 8 and 10 are identical in construction; the following detailed description of the forward carrying attachment 8 will serve for both. The article carrier 8 includes a rigid metal bar 14. In the embodiment selected for illustration, this bar is channel shaped in cross-section and is positioned with its back 16 facing upwardly and its legs 18 extending downwardly. The bar 14 is provided with a series of apertures 19 at intervals along its length for purposes which will appear hereinafter. To the underside of the bar 14 is secured at least two vacuum cups 20 and 22, one near each end, which serve to space the bar from the automobile top and to form a secure footing on which the bar may rest without hazard of damaging the car roof by denting it or by chafing of the finish while the car is in motion with an article in place on the carrier. Each vacuum cup 20, 22, as shown in more detail in Figs. 2, 3, 4 and 6, is formed of solid, relatively soft and resilient rubber material. The under surface 24 of the cup may be approximately spherical in shape to provide a maximum vacuity. The periphery of the cup is provided with an annular bead 26 for the purpose of providing means to facilitate easy removal. In removing the carrier, the bead may be rolled upwardly away from the car top with the fingers, allowing entry of air and thus releasing the cup. The thickness of the rubber material increases inwardly from the bead. Each vacuum cup is further provided with a constricted cylindrical portion 28 having a flat upper face for engagement with the under surface 30 of the back 16 of the bar 14. A member 32 having a threaded bore is permanently imbedded within the rubber of the vacuum cup, for example by molding the rubber material about this threaded member at the time the vacuum cup is formed. As shown, the member 32 is a conventional wing nut. The threaded bore of the member 32 is disposed co-axially of the vacuum cup for cooperation with a bolt 36 which is passed downwardly through one of the apertures 19 in the bar 14 and into a bore 38 in the cylindrical portion 28 of the vacuum cup. The bore 38 leads to the threaded bore of the member 32. The bolt 36 is threaded into the threaded member 32 sufficiently to bring the under face of the bolt head against the upper face of the back 16 of the bar 14 and to draw the vacuum cup upwardly so that the flat face of its cylindrical portion 28 is seated tightly against under surface 30 of the back 16.

The means for detachably fastening the bar 14 to the top of the automobile comprises a pair of straps 40 and 41 each disposed at one side of the car. At their inner ends the straps 40 and 41 are connected to metal rings 42 and 43 respectively. The rings 42 and 43 are secured to the bar 14 by placing them over the cylindrical portions 28 of the vacuum cups before the vacuum cup is mounted on the bar 14. The strap 40 (Figs. 4 and 5) is connected at its outer end to a hook 44, which may be formed from flat sheet metal stock, shaped to engage at its outer end 46 under the gutter or bead 48 of the car top. The inner end of the hook 44 is provided with a slot 50 through which the strap 40 is passed. The strap 40 is adjustable in length by means of a tension slide 52. The tension slide 52 comprises a main body portion 54 and a keeper 56 slidable thereon and having a series of teeth 58. The strap is threaded through the tension slide so that the tension slide is freely slidable along the strap when the strap is not under tension, as shown particularly in Fig. 4, and when so threaded is securely held at the length to which it is adjusted when under tension, yet may be easily adjusted when not under tension. This particular arrangement of strap and slide also permits the strap end 59 to be left loose for further adjustment, and allows the strap end 59 to be hidden between the strap folds.

The strap 41 at the other end of the bar is adjustable in length by means of a similar tension slide 60 and is connected at its outer end to a toggle fastener indicated generally at 62. This toggle fastener carries at its outer end a hook 64 adapted to engage under the gutter 66 at the side of the car top. The hook 64 is connected to the toggle operating handle 68 by means of a link 70, preferably of metal, which carries on its inner face a pad 72 of rubber or other soft material which will not mar the finish of the automobile top. The outer end of the strap 41 is connected to the toggle operating handle 68 by a bail 74 at a point closer to the free end of the handle than the connection of the link 70. Consequently, when the toggle operating handle 68 is moved from its releasing position shown in dotted lines to its full line position as shown in Fig. 2, the distance between the hook 64 and the outer end of the strap 41 is shortened to clamp the article carrier in mounted position. The pad 72 holds the link 70 in spaced relation to the car top and assures that the operating handle 68 will move past its dead center position as it is moved into its clamping position and that it will remain beyond dead center position, to clamp the carrier in place, until it is intentionally operated to its releasing position.

For carrying skis and other articles of a similar shape and size, I provide a removable clamp 76 illustrated particularly in Figs. 2 and 4. Each clamp is formed of a length of flat spring steel stock formed generally in the shape of a U and having its free ends 78 bent inwardly toward each other and then reversely outwardly as shown. The closed end 80 of the clamp is flattened to lie closely in contact with the flat back 16 of the bar 14. The closed end 80 is provided with an aperture 82 for the reception of a bolt 84 by means of which the clamp 76 is secured to the bar 14 through the use of a wing nut 86.

For carrying larger articles, such as light boats or the article 12 shown, I provide a pair of clips 88 adapted to receive a strap 90 which may be passed about the article to be carried. Each clip 88 (Figs. 2, 4 and 5) is generally U-shaped and disposed to embrace the bar 14 with its arms 92 and 94 extending upwardly on opposite sides of the bar 14. A threaded rod 96, which may be a conventional carriage bolt, is passed through apertures in the arms 92 and 94 and held in position by means of a wing nut 98. The clips 88 are slidable on the bar 14 and may be clamped in the desired position by tightening the wing nuts 98.

Preferably the free ends 78 of the ski clamps 76 are provided with means for protecting the skis from marring. This means may comprise a rubber coating formed by dipping the clamps in a rubber latex to deposit rubber thereon or it may be formed by pulling a short length of rubber tubing 110 of the proper size over the free ends of the arms.

The arms 92 and 94 of the clips 88 and the ends of the hooks 44 and 64 which engage with the gutter or bead of the automobile body are preferably similarly coated or covered with rubber to prevent damage to the finish of the car.

The operation of the article carrying device of the present invention will be generally apparent from its construction as described above. Ordinarily, at least two of the carriers will be used at the same time on the automobile top although a single one may be sufficient for some small and light articles. The attachment is mounted on the top of the car in the position shown in Fig. 1. If the car top has a fabric-covered area in its center, the vacuum cups 20, 22 may be positioned in the appropriate openings 19 in bar 14 to cause them to engage with the metal covered part of the roof surrounding the fabric. The vacuum cups 20, 22 may be secured to the car top by pressing downwardly on the bar 14 directly over each cup to force out the air which lies between the under surface 24 of the cup and the car top. It is not necessary, however, that the vacuum cups be secured to the top because the carrying attachment of my invention does not rely on the vacuum cups alone for holding it in position. The vacuum cups serve to form a suitable bearing by which the attachment may rest on the car top. The bar 14 is held in place primarily by the straps 40 and 41. These are attached by engaging the end of the hook 44 under the gutter at the side of the car and adjusting the length of the strap 40 by movement of the tension slide 52 until the bar 14 is transversely centered on the top of the car. The hook 64 is then engaged under the gutter 66 at the opposite side of the car and the tension slide 60 adjusted so that both straps 40 and 41 are pulled taut when the toggle operating handle 68 is moved into its closed position illustrated in full lines in Fig. 2. The second carrier, if required, is positioned on the top of the car in the same way but at a point spaced from the first carrier.

It will be understood that the bar 14 of each carrier will be provided with the desired number of ski clamps 76 and that these clamps may be positioned in any of the apertures 19 desired. For carrying other types of articles, the bars 14 each may be provided with a pair of clips 88 and a suitable strap, or combination of straps, for accommodating the articles to be carried. Both ski clamps 76 and clips 88 and straps may be used at the same time, as illustrated in Fig. 1.

An article, such as the pair of skis 112 illustrated in Figs. 1 and 2 may be placed in or removed from the clamps 76 quickly and conveniently while these are in position on the automobile top. When in position in the clamps 76, the skis will be securely held, even when the car is driven over rough roads, without injury to the car or to the skis. The clamps 76 will firmly engage and securely hold either skis of the type shown at 112 in Figs. 1 and 2, or skis which have a ribbed upper surface, as shown at 114 in Fig. 4.

To secure an article, such as a boat, to the bar 14 a pair of clips 88 is mounted on the bar and a strap 90 is passed about the rods 96. The boat or other article 12 is then placed on the lower flight 102 of the strap, as shown in Fig. 1, and the upper ends of the strap passed over the article and secured together by the buckle 104. Preferably, the clips 88 are placed in such positions on the bar 14 as to lie closely adjacent the article to be carried. The strap 90 preferably is made up of two separate straps, 106 and 108, of different lengths. For example, the strap 106 may be about four feet long and the strap 108 may be about six feet long. If the article 12 is relatively small, the shorter strap 106 may be used alone. When the article is larger, the strap 108 alone may serve. For still larger articles, the two straps may be joined together, by fastening the free end of one in the buckle of the other, and then employed as a single strap, as shown in Fig. 1.

When the article carrier is to be removed from the automobile top, it is necessary only to release the toggle 62 by swinging the toggle operating handle 68 upwardly into the dotted line position shown in Fig. 2. This increases the spacing between the hook 64 and the strap 41 to permit the hook 64 to be removed from the gutter 66. Thereafter the hook 44 at the other side of the car may be disengaged from the car top and the carrier removed completely. The bead 26 at the edges of the vacuum cups facilitates engaging and lifting of these edges by hand to break the vacuum in the cups and free them from the car top.

Once the straps 40 and 41 have been adjusted in length to fit a particular car, the attachment thereafter may be applied and removed simply by use of the toggle 62 without further need for adjustment of the tension slides 52 and 60.

The foregoing disclosure of a preferred embodiment of my invention is made by way of illustration and not of limitation. It will be appreciated that changes therein may be made by those skilled in the art without departure from my invention as defined in the following claim.

I claim:

An article carrying attachment adapted to be detachably mounted on the top of an automobile, comprising an elongated relatively rigid bar having a plurality of apertures distributed along the length thereof, vacuum cups having relatively constricted upper ends detachably connected to the under side of said bar by fasteners passing through said apertures, a strap connected at its inner end to each of said constricted portions, means for adjusting the length of said straps, a hook connected to the outer end of one of said straps and shaped to engage under the bead at the edge of an automobile top, a hook at the outer end of the other strap and means including a toggle mechanism connecting said second hook to said other strap, a U-shaped spring clamp for securing an article to be carried to said bar, detachably connected to the upper side of said elongated bar by a fastener passing through one of said apertures, means adjustable along the length of said bar for connecting a strap thereto and a strap connected to said means and passing about the article to be carried.

EDISON R. BRANDT.

REFERENCES CITED

The following references are of record in the file of this patent:

UNITED STATES PATENTS

| Number | Name | Date |
|---|---|---|
| 1,970,962 | Hinckley | Aug. 21, 1934 |
| 2,318,971 | Roumage et al. | May 11, 1943 |
| 2,235,012 | Colvin | Mar. 18, 1941 |
| 2,372,558 | Dowd | Mar. 27, 1945 |

FOREIGN PATENTS

| Number | Country | Date |
|---|---|---|
| 61,913 | Norway | Jan. 15, 1940 |
| 836,940 | France | Oct. 25, 1938 |
| 835,488 | France | Sept. 26, 1938 |
| 216,092 | Switzerland | Nov. 17, 1941 |